US005398659A

United States Patent [19]

Zimmerman et al.

[11] Patent Number: 5,398,659

[45] Date of Patent: Mar. 21, 1995

[54] FUEL SENDER FOR MOTOR VEHICLE FUEL SYSTEM

[75] Inventors: William S. Zimmerman, Grand Blanc; Wayne F. Harris, Lapeer; Ulf Sawert, Grand Blanc; Randall L. Dockery, Flushing; Timothy F. Coha, Burton, all of Mich.

[73] Assignee: General Motors Corporation, Detroit, Mich.

[21] Appl. No.: 168,243

[22] Filed: Dec. 17, 1993

[51] Int. Cl.[6] ........................ F02M 37/04; B01D 27/10

[52] U.S. Cl. ........................................ 123/514; 210/130

[58] Field of Search ................ 123/509, 497, 514, 516; 210/130, 131, 132; 137/545, 547

[56] References Cited

U.S. PATENT DOCUMENTS

| | | | |
|---|---|---|---|
| 3,023,905 | 3/1962 | McDougal et al. | 210/172 |
| 3,108,065 | 10/1963 | McMichael | 210/172 |
| 3,275,145 | 9/1966 | Jacobellis | 137/547 |
| 4,303,513 | 12/1981 | Lundquist | 210/132 |
| 4,304,664 | 12/1981 | McAlindon et al. | 210/172 |
| 4,340,023 | 7/1982 | Creager | 123/510 |
| 4,574,728 | 3/1986 | Barnard, Jr. | 210/130 |
| 4,747,388 | 5/1988 | Tuckey | 123/514 |
| 4,869,225 | 9/1989 | Nagata et al. | 123/509 |
| 4,935,128 | 6/1990 | Hoeptner, III | 210/130 |
| 4,945,884 | 8/1990 | Coha et al. | 123/509 |
| 4,971,017 | 11/1990 | Beakley et al. | 123/509 |
| 5,160,037 | 11/1992 | LeCour | 210/132 |
| 5,170,764 | 12/1992 | Tuckey | 123/514 |
| 5,195,494 | 3/1993 | Tuckey | 123/514 |
| 5,237,977 | 8/1993 | Tuckey | 123/514 |

*Primary Examiner*—Raymond A. Nelli
*Assistant Examiner*—Thomas N. Moulis
*Attorney, Agent, or Firm*—Saul Schwartz

[57] ABSTRACT

Fuel sender at a remote or terminal end of a suction circuit of a fuel system of a motor vehicle. The fuel sender includes an unsealed reservoir in a fuel tank of the vehicle replenished by return fuel from a return fuel circuit of the fuel system and a junction chamber in the reservoir communicating with the terminal end of the suction circuit and with each of a primary flow channel and a secondary flow channel. The primary flow channel terminates at a primary screen in the fuel tank outside the reservoir. The secondary flow channel terminates at a secondary screen inside the reservoir. The secondary flow channel is restricted relative to the primary flow channel so that vacuum in the suction circuit induces flow in the primary flow channel in preference to flow in the secondary channel. Under low fuel conditions, the primary flow channel is blocked and vacuum in the suction circuit induces flow in the secondary flow channel from the reservoir. The secondary screen is flexible and actuates a differential pressure responsive bypass valve to connect the secondary flow channel directly to the reservoir when both the primary and the secondary screens are blocked.

6 Claims, 2 Drawing Sheets

FUEL SENDER FOR MOTOR VEHICLE FUEL SYSTEM

FIELD OF THE INVENTION

This invention relates to motor vehicle fuel systems.

BACKGROUND OF THE INVENTION

The fuel system of a vehicle equipped with a diesel engine often includes a fuel pump mounted on the engine, a fuel tank, and hoses, pipes and the like, both external and internal to the fuel tank, defining a suction circuit between the tank and an inlet of the fuel pump. Surplus fuel is returned to the tank through a return circuit. In many such fuel systems, the remote end of the suction circuit in the fuel tank is simply a vertically supported pipe the bottom of which is covered by a screen made of strands of a synthetic fabric such as nylon or polyester woven such that the screen is permeable to diesel fuel when fully submerged, impermeable to fuel vapor when partially submerged, and generally impermeable to water when fully or partially submerged. A differential pressure actuated bypass valve opens when the fuel pump induces inordinately high vacuum in the suction circuit due to blockage of the screen, e.g. by wax in the diesel fuel forming on the screen under cold weather conditions. In more advanced systems, the remote end of the suction circuit terminates at a so-called "fuel sender" the characterizing feature of which is a reservoir at the bottom of the fuel tank which aggregates enough fuel around the screen to prevent momentary starvation of the fuel pump when fuel sloshes back and forth in the tank. In some fuel senders, the reservoir is simply a gravity filled container surrounding the screen. In another fuel sender, the reservoir is a sealed container surrounding an unscreened end of the aforesaid vertically supported pipe. The reservoir in the latter fuel sender is replenished by new fuel from the fuel tank through a screen over an inlet port in the bottom of the reservoir and also by return fuel emptying into the sealed reservoir through a float controlled valve and seal. A fuel sender according to this invention is an improvement over the aforesaid gravity filled fuel sender and the aforesaid sealed fuel sender.

SUMMARY OF THE INVENTION

This invention is a new and improved fuel sender at a remote or terminal end of a suction circuit of a fuel system of a motor vehicle. The fuel sender according to this invention includes an unsealed reservoir replenished by return fuel from a return fuel circuit of the fuel system and a junction chamber in the reservoir communicating with the terminal end of the suction circuit and with each of a primary flow channel and a secondary flow channel. The primary flow channel terminates at a primary screen in the fuel tank outside the reservoir. The secondary flow channel terminates at a secondary screen inside the reservoir. The secondary flow channel is restricted relative to the primary flow channel so that vacuum in the suction circuit induces flow in the primary channel in preference to flow in the secondary channel. Under low fuel conditions, the primary screen defines a blockage at the end of the primary flow channel so that vacuum in the suction circuit induces flow in the secondary flow channel from the reservoir. The secondary screen is flexible and actuates a differential pressure responsive bypass valve to connect the secondary flow channel directly to the reservoir when both the primary and the secondary screens are blocked. In a preferred embodiment, preferential flow in the primary flow channel is induced by a zone of restricted cross sectional flow area in the secondary flow channel and/or by the secondary screen obstructing flow to a greater degree than the primary screen. For purging water from the fuel tank, the primary screen may have a small fabric patch near the bottom of the fuel tank which is highly permeable to water.

DESCRIPTION OF A PREFERRED EMBODIMENT

Figure 1:
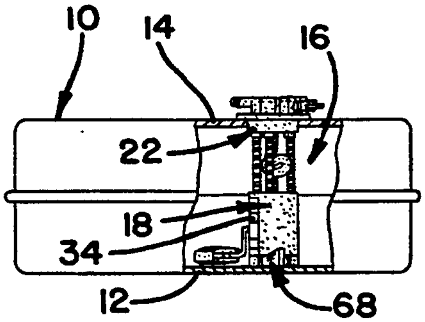
FIG. 1 is a fragmentary, partially broken-away view of a fuel system of a motor vehicle including a fuel sender according to this invention.
Figure 2:
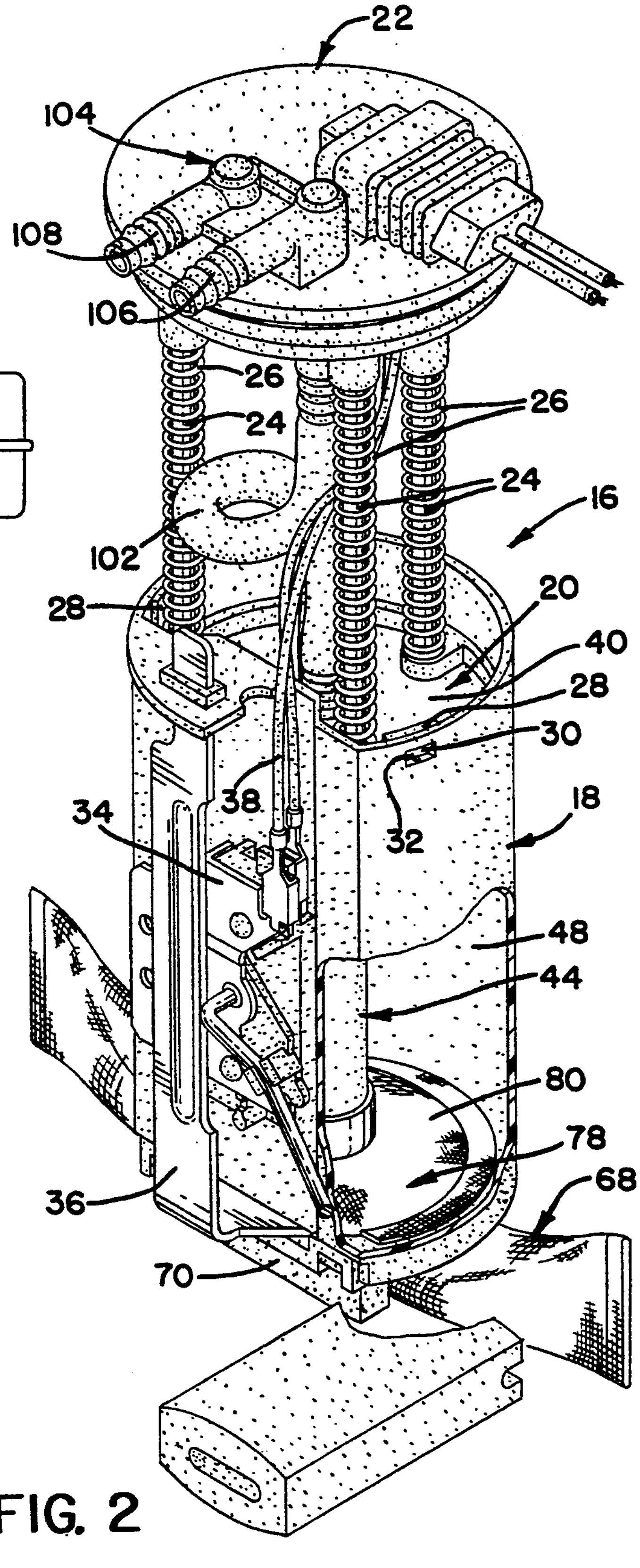
FIG. 2 is a fragmentary, partially broken-away, perspective view of a fuel sender according to this invention.

Referring to FIGS. 1–2, a fuel tank 10 of a motor vehicle, not shown, includes a bottom panel 12 and a top panel 14. A fuel sender 16 according to this invention is disposed in the fuel tank and includes a molded, cup-shaped plastic container or reservoir 18, a molded plastic cap 20 for the reservoir, a molded plastic cover 22 in an access opening in the top panel 14 of the fuel tank, and a plurality of tubular struts 24 each surrounded by a corresponding one of a plurality of springs 26.

Figure 3:
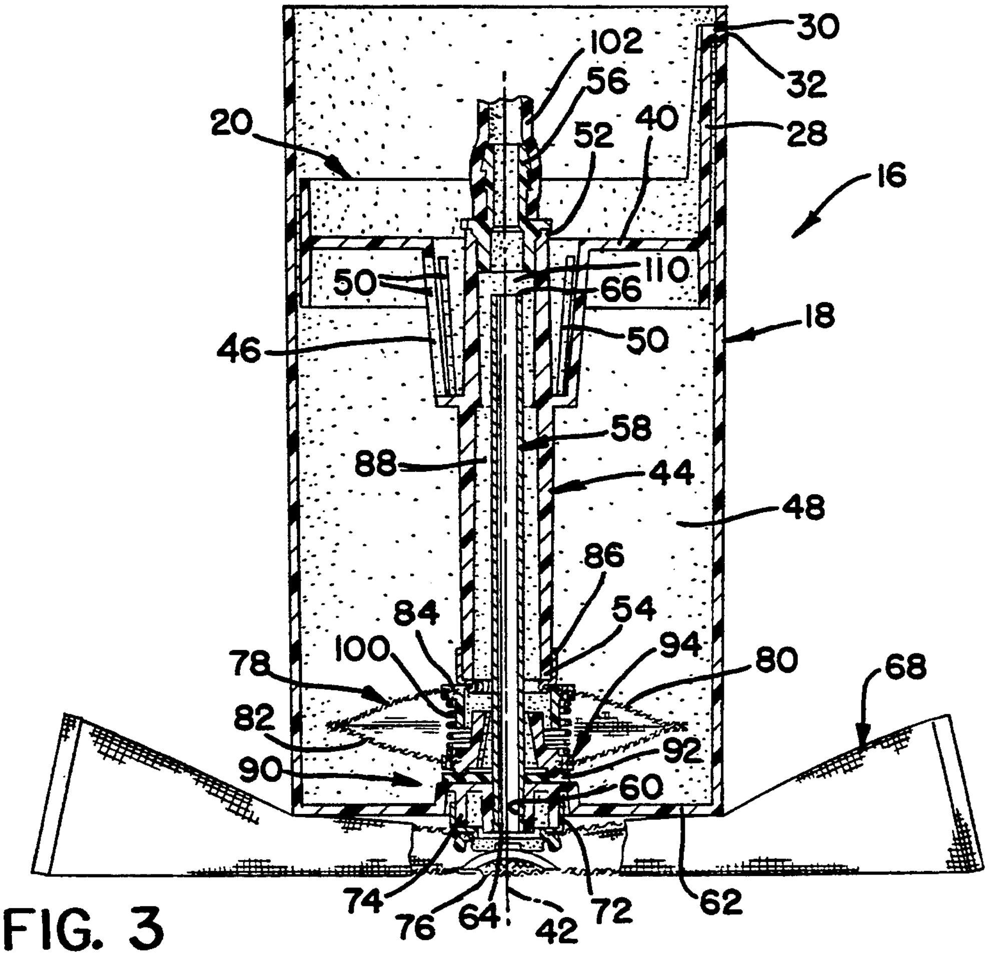
FIG. 3 is a sectional view in elevation of a fuel sender according to this invention.

As seen best in FIGS. 2–3, the plastic cap 20 is generally disc-shaped and fits somewhat loosely within the cylindrical wall of the reservoir. The cap has a plurality of integral, flexible arms, only a single arm 28 being visible in FIG. 3. Each flexible arm has a tang 30 thereon which snaps into a corresponding notch 32 in the reservoir for retention.

The upper end of each strut 24 is rigidly connected to the cover 22. The lower end of each strut is slidably received in a socket, not shown, in the plastic cap 20. The springs 26 bias the cap and the reservoir against the bottom panel 12 of the fuel tank. A float controlled transducer 34 is mounted on a metal bracket 36 on the reservoir 18 and provides an electrical signal through a wiring harness 38 corresponding to the level of the surface of the pool of diesel fuel in the tank relative to the bottom panel 12 of the tank.

As seen best in FIG. 3, the plastic cap 20 has a disc-shaped web 40 perpendicular to a longitudinal centerline 42 of the reservoir, a tubular wall 44 symmetric about the centerline 42, and a cup-shaped connecting wall 46 connecting the web and the tubular wall. The cap closes the top of the reservoir 18 and cooperates therewith in defining a return fuel chamber 48 in the reservoir. The return fuel chamber is vented to the fuel tank through clearances between the cap and the reservoir and through a plurality of apertures 50 in the connecting wall 46. The tubular wall 44 has an upper end 52 outside the return fuel chamber 48 and a lower end 54 inside the return fuel chamber. A barbed fluid connector 56 is rigidly attached to the tubular wall 44 at the upper end thereof.

Figure 4:
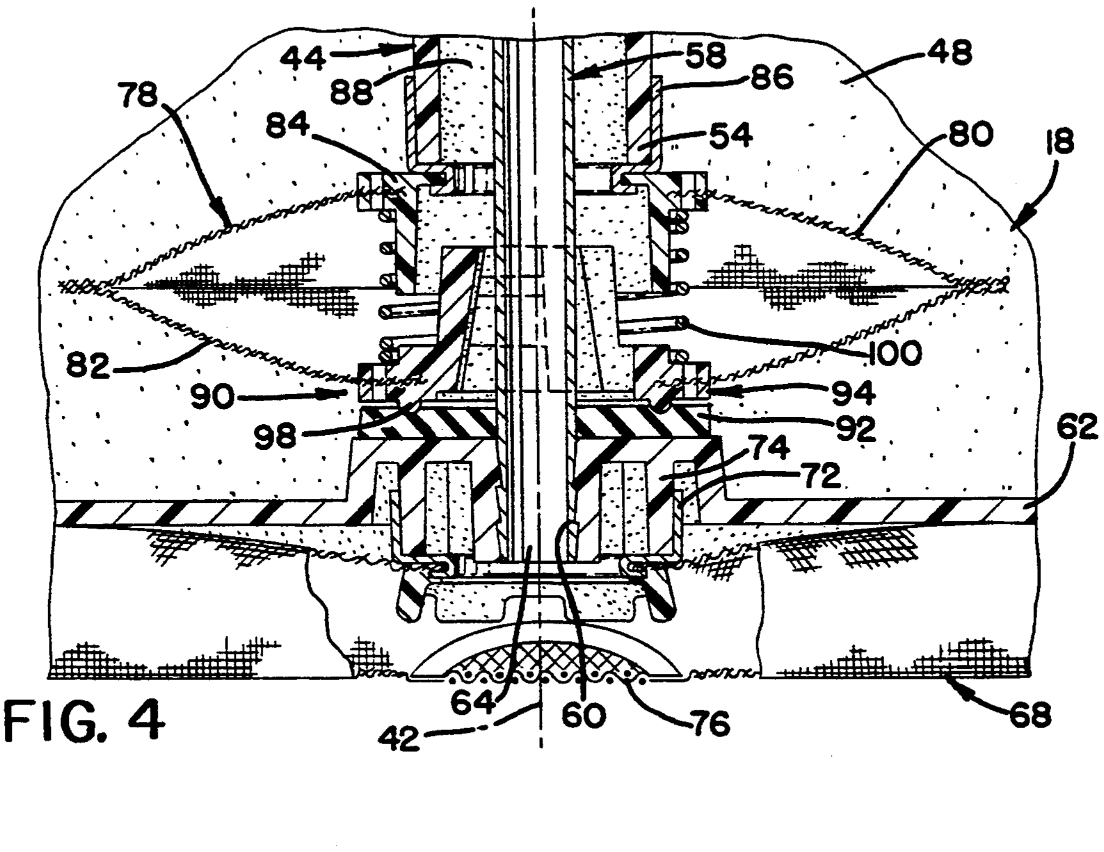
FIG. 4 is an enlarged view of a portion of FIG. 3.

As seen best in FIGS. 3—4, a tube 58 aligned on the centerline 42 of the reservoir inside the tubular wall 44 is press fitted in a bore 60 in a bottom wall 62 of the reservoir. The tube 58 has an open bottom end 64 and terminates at an open top end 66 below the connector 56. A primary screen 68 in the fuel tank outside the reservoir is disposed below the bottom wall 62 and adjacent a support 70 on the reservoir which is pressed against the bottom panel 12 of the fuel tank by the springs 26. A metal ferrule 72 attached to the screen 68 is press fitted onto an annular boss 74 on the bottom wall 62 of the reservoir around the bottom end of the tube 58. Fuel in the fuel tank 10 is thus forced to traverse the primary screen 68 before entering the bottom end of tube 58.

The primary screen 68 is made of synthetic material, such as nylon, woven in plain weave such that the primary screen is permeable to liquid fuel but generally impermeable to water. In addition, when partially submerged in liquid fuel, the wicking characteristic of the woven fabric renders the screen impermeable to fuel vapor and/or air. For purging water from the fuel tank, the primary screen 68 may include a metal filter 76 or, alternatively, a small fabric patch, not shown, through which any water collecting at the bottom of the fuel tank may be drawn into the tube 58.

A generally flat or pancake-like secondary strainer 78 of the fuel sender 16 is disposed in the return fuel chamber 48 of the reservoir and includes an upper ply 80 and a lower ply 82, each symmetric about the centerline 42 and sealed to each other around the periphery of the secondary strainer. A plastic spring seat 84 is attached to the upper ply 80 and a cup-shaped metal ferrule 86 is attached to the plastic spring seat. The metal ferrule is press fitted onto the lower end 54 of the tubular wall 44 whereby the secondary strainer is mounted on the tubular wall in flow communication with an annulus 88, FIGS. 3–4, defined between the tubular wall 44 and the tube 58 therein.

The secondary screen 78 is made of synthetic material, such as nylon, woven in plain weave such that the secondary screen is permeable to liquid fuel but generally impermeable to water. In addition, when partially submerged in liquid fuel, the wicking characteristic of the woven fabric renders the secondary screen impermeable to fuel vapor and/or air.

As seen best in FIG. 4, a differential pressure responsive bypass valve 90 of the fuel sender 16 includes a circular, elastomeric valve seat 92 on the bottom wall 62 of the reservoir around the tube 58 and an annular plastic valve element 94 attached to the lower ply 82 of the secondary strainer and having an annular bead 98 thereon facing the valve seat. A spring 100 inside the secondary strainer between the spring seat 84 and the valve element 94 biases the valve element to a closed position, FIGS. 3–4, wherein the bead 98 is pressed against the valve seat. In the closed position of the valve element, all diesel fuel flowing from the return fuel chamber 48 into the annulus 88 must traverse the secondary screen 78. The valve element 94 has an open position, not shown, in which the spring 100 is compressed and the valve element vertically separated from the valve seat. In the open position of the valve element, diesel fuel flows directly from the return fuel chamber 48 into the annulus 88.

As seen best in FIGS. 2—3, a flexible hose 102 is attached to the barbed connector 56 outside the return fuel chamber and to an inside end of a first connector 104 on the plastic cover 22. An outside end 106 of the first connector 104 receives a hose, not shown, which defines the aforesaid remote or terminal end of the suction circuit of the fuel system of the vehicle. An inlet of a fuel injection pump, not shown, remote from the fuel tank 10 defines the opposite end of the suction circuit.

A second connector 108 on the cover 22 communicates through conventional conduit means, not shown, with the aforesaid return flow circuit of the fuel system of the vehicle. As described in U.S. Pat. No. 4,945,884, issued Aug. 7, 1990 and assigned to the assignee of this invention, return flow directed to the second connector 108 is conducted through the cover 22 and through one of the struts 24 into the return fuel chamber 48.

Referring to FIG. 3, a junction chamber 110 is defined in the reservoir 18 in the tubular wall 44 between the top end 66 of the tube 58 and the connector 56. The junction chamber communicates with the suction circuit of the fuel system through the connector 56. A primary flow channel of the fuel sender 16 from the fuel tank to the junction chamber 110 includes the tube 58 and the primary screen 68. A secondary flow channel of the fuel sender 16 from the return fuel chamber 48 to the junction chamber 110 includes the annulus 88 and the secondary screen 78. Relative to the primary flow channel, the secondary flow channel is more flow restricted due to the reduced flow area of the annular gap between the top end 66 of the tube 58 and the connector 56 and/or because the secondary screen 78 is designed to obstruct flow to a predetermined greater degree than the primary screen 68 through material selection, weave selection, and/or number of fabric plies in each screen.

The fuel sender 16 operates as follows. When the fuel tank is not almost empty, e.g. the primary screen 68 is fully submerged in fuel, and the fuel pump is on, vacuum in the suction circuit induces fuel flow into the junction chamber through the primary flow channel in preference to the secondary flow channel. Concurrently, surplus fuel from the engine is deposited in the return fuel chamber 48 of the reservoir 18. When the return fuel chamber is full, return fuel overflows into the fuel tank through the apertures 50 and the clearances between the cap 20 and the reservoir.

If, after a period of idleness under cold weather conditions, wax from the diesel fuel forms on and blocks both the primary and secondary screens 68,78, then the onset of vacuum in the suction circuit corresponding to the fuel pump being turned on induces an inordinately high vacuum in the junction chamber 110 and in each of the primary and secondary flow channels. The high vacuum, in turn, induces an inordinately high pressure difference across the lower ply 82 of the secondary screen 78 which strokes the bypass valve element 94 from its closed position to its open position, whereupon fuel flows around the secondary screen and directly into the secondary flow channel.

Within a short duration after engine start, return fuel tends to heat the fuel in the return fuel chamber 48 and in the fuel tank to a temperature sufficient to liquify the wax formed on the primary and secondary screens. In that circumstance, the spring 100 returns the bypass valve element 94 to its closed position and fuel flow proceeds through the primary flow channel in preference to the secondary flow channel.

Under low fuel conditions with the primary and secondary screens unblocked, fuel flow switches between the primary and the secondary flow channels in accordance with exposure of the primary screen 68 to vapor in the fuel tank. For example, in a turn, fuel in the tank may slosh to one side of the tank, leaving the primary screen only partially submerged. In that circumstance, the primary screen defines a blockage in the primary flow channel and the vacuum induced in the suction circuit immediately induces fuel flow in the secondary flow channel from the return fuel chamber so that the fuel pump is not starved. When the primary strainer is resubmerged after the turn is completed, the blockage defined by the primary screen disappears and the relative restrictions in the primary and secondary flow channels initiates flow in the primary flow channel in preference to the secondary flow channel.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a motor vehicle fuel system including a fuel tank, a fuel pump remote from said fuel tank, a suction circuit connected to an inlet of said fuel pump so that a vacuum is induced in said suction circuit when said fuel pump is on, and a return circuit for returning surplus fuel said fuel tank, a fuel sender comprising:

a reservoir in said fuel tank having a cap thereon cooperating with said reservoir in defining a return fuel chamber in said reservoir, means connecting said return circuit to said return fuel chamber so that said surplus fuel is deposited first in said return fuel chamber, means defining a junction chamber in said reservoir, means connecting said junction chamber to said suction circuit, means defining a primary flow channel between said fuel tank and said junction chamber including a primary screen outside said reservoir, means defining a secondary flow channel between said return fuel chamber and said junction chamber including a secondary screen in said return fuel chamber, and means operative to effect a predetermined flow restriction in said primary flow channel and a predetermined flow restriction in said secondary flow channel, said predetermined flow restriction in said secondary flow channel exceeding said flow restriction in said primary flow channel so that the vacuum in said suction circuit induces fluid flow in said primary flow channel from said fuel tank to said junction chamber in preference to fuel flow in said secondary flow channel.

2. The fuel sender recited in claim 1 further including:

a differential pressure responsive bypass valve between said return fuel chamber and said secondary flow channel operative when blockage of said primary screen and said secondary screen induces an inordinately high vacuum in each of said secondary flow channel and said primary flow channel to effect direct communication between said return fuel chamber and said secondary flow channel.

3. The fuel sender recited in claim 2 wherein:

said means defining said primary and said secondary flow channels includes a tubular wall on said cap aligned on a vertical centerline of said reservoir and having an upper end closed by said cap and a lower end connected to said secondary screen, a fluid connector on said cap open to said tubular wall at said upper end thereof and connected to said suction circuit, and a tube rigidly connected to and aligned on said vertical centerline of said reservoir inside said tubular wall having an open bottom end communicating with said primary screen outside said reservoir and an open top end spaced from said connector and cooperating with said tubular wall in defining an annulus therebetween communicating with said secondary screen, said junction chamber being defined inside said tubular wall between said connector and said top end of said tube, said primary flow channel including said tube and said primary screen, and said secondary flow channel including said annulus and said secondary screen.

4. The fuel sender recited in claim 3 wherein:

said secondary screen is symmetric about said vertical centerline of said reservoir and includes a generally disc-shaped upper ply connected to said lower end of said tubular wall, and a generally disc-shaped lower ply sealed to said upper ply around the periphery of each of said upper and said lower plies.

5. The fuel sender recited in claim 4 wherein said bypass valve includes means defining a valve seat on a bottom wall of said reservoir symmetric about said vertical centerline of said reservoir, means defining a valve element on said lower ply of said secondary screen symmetric about said vertical centerline of said reservoir having a closed position engaging said valve seat and an open position remote from said valve seat, and a spring means biasing said valve element to said closed position.

6. The fuel sender recited in claim 5 wherein said spring means biasing said valve element to said closed position includes:

a spring seat rigidly connected to said lower end of said tubular wall, and a spring between said spring seat and said valve element.

* * * * *